(12) United States Patent
Schadler et al.

(10) Patent No.: US 8,845,113 B2
(45) Date of Patent: *Sep. 30, 2014

(54) DRIVE FOR A COMPONENT TO BE ADJUSTED

(75) Inventors: Bernhard Schadler, Sinabelkirchen (AT); Hermann Dornhofer, Birkfeld (AT)

(73) Assignee: Magna Auteca AG (AT)

( * ) Notice: Subject to any disclaimer, the term of this patent is extended or adjusted under 35 U.S.C. 154(b) by 139 days.

This patent is subject to a terminal disclaimer.

(21) Appl. No.: 13/144,405

(22) PCT Filed: Jan. 13, 2010

(86) PCT No.: PCT/EP2010/000239
§ 371 (c)(1),
(2), (4) Date: Sep. 21, 2011

(87) PCT Pub. No.: WO2010/081733
PCT Pub. Date: Jul. 22, 2010

(65) Prior Publication Data
US 2012/0099213 A1 Apr. 26, 2012

(30) Foreign Application Priority Data
Jan. 14, 2009 (EP) .................................... 09075019

(51) Int. Cl.
*G02B 7/198* (2006.01)
*B60R 1/072* (2006.01)
*B60R 1/066* (2006.01)

(52) U.S. Cl.
CPC ................ *B60R 1/066* (2013.01); *B60R 1/072* (2013.01); *G02B 7/198* (2013.01)
USPC .......................................... 359/876; 359/872

(58) Field of Classification Search
CPC ............................... G02B 7/198; B60R 1/072
USPC ................... 359/877, 872, 876; 248/478, 479
See application file for complete search history.

(56) References Cited

U.S. PATENT DOCUMENTS 4,585,200 A * 4/1986 Fisher ........................... 248/487
5,969,891 A * 10/1999 Otenio et al. ................. 359/871

(Continued)

FOREIGN PATENT DOCUMENTS

| DE | 19902757 A1 | 7/2000 |
| WO | WO-98/31565 A1 | 7/1998 |
| WO | WO-03/054401 A1 | 7/2003 |

OTHER PUBLICATIONS

"International Application No. PCT/EP2010/000239, International Search Report and Written Opinion mailed Mar. 16, 2010", 12 pgs.

(Continued)

*Primary Examiner* — Alicia M Harrington
*Assistant Examiner* — Marin Pichler
(74) *Attorney, Agent, or Firm* — Schwegman Lundberg & Woessner, P.A.

(57) ABSTRACT

A drive for a component to be adjusted, in particular for an adjustable automotive vehicle mirror, having a housing which can be mounted on a stationary structure and has a central axis for receiving drive elements, and having an element which encompasses the housing at least partially and is connected to a carrier for the component. The encompassing element with the carrier is disposed pivotably relative to the housing. About the central axis, a pin-like sleeve for guiding through a mounting element is disposed in the housing and has a plate spring-like projection for support on the base of the housing. The plate spring-like projection forms a means for uniform distribution of the tension force caused by the mounting element for mounting on the stationary structure.

12 Claims, 2 Drawing Sheets

(56) References Cited

U.S. PATENT DOCUMENTS

Figure 1:
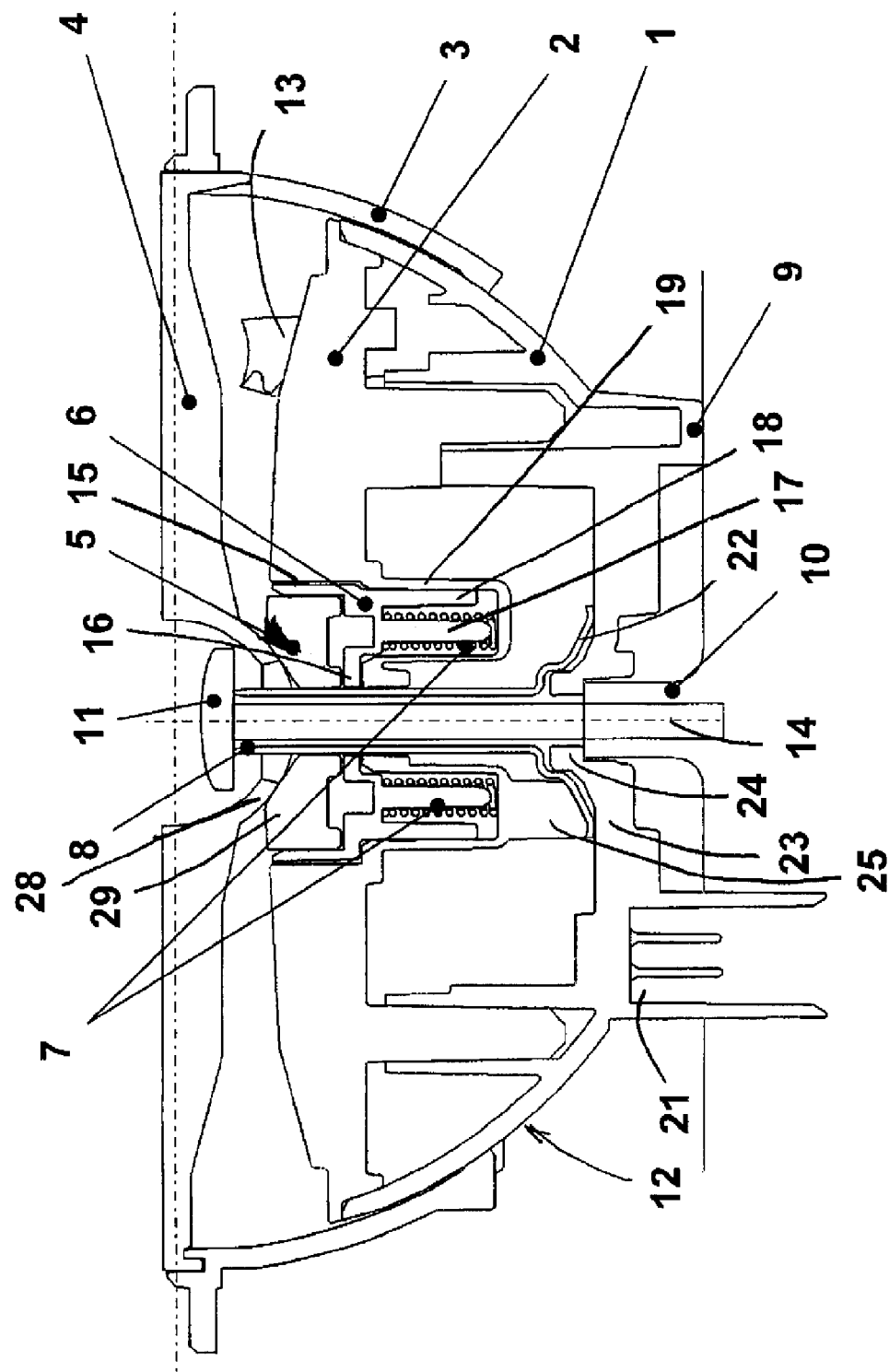

| | | | |
|---|---|---|---|
| 7,044,676 B2* | 5/2006 | Schuurmans | 403/92 |
| 7,645,044 B2* | 1/2010 | Lee | 359/876 |
| 2002/0063978 A1* | 5/2002 | Guttenberger et al. | 359/877 |
| 2005/0030655 A1* | 2/2005 | Tsuyama | 359/878 |
| 2008/0043354 A1* | 2/2008 | Fukai et al. | 359/877 |

OTHER PUBLICATIONS

"International Application No. PCT/EP2010/000239, Translation of International Preliminary Report on Patentability mailed Jul. 28, 2011", 14 pgs.

\* cited by examiner

DRIVE FOR A COMPONENT TO BE ADJUSTED

PRIORITY CLAIM TO RELATED APPLICATIONS

This application is a national stage application under 35 U.S.C. §371 of PCT/EP2010/000239, filed Jan. 13, 2010, and published as WO 2010/081733 A1 on Jul. 22, 2010, which claims priority to European Application No. 09075019.1, filed Jan. 14, 2009, which applications and publication are incorporated herein by reference and made a part hereof in their entirety, and the benefit of priority of each of which is claimed herein.

The invention relates to a drive for a component to be adjusted, in particular for an adjustable automotive vehicle mirror according to the preamble of the main claim.

A large number of drives for a component to be adjusted, in particular for the automotive vehicle sphere, is known, the components to be adjusted relative to a stationary structure being mirrors, flaps for ventilation units and heating units or the like.

A drive device for an adjustable rearview mirror is known for example from WO 98/31565. A drive housing in shell form and made of plastic material which is fixed to the vehicle is thereby provided, which drive housing receives motors and transmission elements, such as gear wheels or screws. The housing forms a spherical guide face, with its outer face, for an outer shell which encompasses the housing and is connected to a mirror carrier which is pivotable about two imaginary axes for adjustment of the rearview mirror and on which a mirror glass is mounted. In the outer shell encompassing the housing, at least one gearing, preferably two gearings, is provided, gear wheels driven by electromotors via transmission elements penetrate through the housing and, for adjustment of the encompassing outer shell connected to the mirror carrier, engaging with the gearings thereof. The carrier plate is connected to the outer shell via a central screw which penetrates through the housing and is screwed into a threaded projection of said outer shell. The housing has lateral mounting projections for penetration of screws which serve for mounting on the stationary structure. The outer shell is provided with corresponding openings.

It has also been attempted in prior art to mount drives on the stationary structure with only one screw. However, the screw became loose here because of creep behaviour of the plastic material, as a result of which the drive can wobble.

Starting from the known state of the art, the object underlying the invention is to produce a drive for a component to be adjusted, in particular for an adjustable automotive vehicle mirror, which ensures secure mounting and support on the stationary structure over the entire lifespan of the drive element, means provided for this purpose being intended to be constructionally simple and easy to install.

This object is achieved according to the invention by the characteristic features of the main claim in conjunction with the features of the preamble.

By means of the measures indicated in the sub-claims, advantageous developments and improvements are possible.

As a result of the fact that, about the central axis, a pin-like sleeve which is disposed in the housing for guiding through a mounting element and has a plate-like projection for support on the base of the housing, the plate spring-like projection forming a means for uniform distribution of the tension force caused by the mounting element for mounting on the stationary structure, the tension force which is produced after the drive is screwed together with the stationary structure is distributed to the inside or to the base of the housing and hence to the support points. As a result, a secure and uniform supporting of the drive is achieved over the lifespan.

In a preferred embodiment, the housing consists of a shell-shaped lower housing, the outer face of which represents the contact face to the annular, encompassing element which forms a partial shell, and a cover-like upper housing which has an opening for penetration of the end of the sleeve which is opposite the plate-shaped projection. As a result, a simple construction is made available.

As a result of the fact that a raised portion which points into the interior of the housing is moulded advantageously on the base of said housing and is covered by the plate spring-like projection, the latter is fixed in addition and the air present under the projection without the raised portion is eliminated in addition, as a result of which the introduction of force into the base and into at least three support projections as support points on the stationary structure is improved.

In a preferred embodiment, at least one projection moulded on the upper housing is provided, which, for improving positioning, forms a limit stop for holding down the plate spring-like projection.

Advantageously, means are provided around the sleeve for elastic pretension between the housing and the encompassing element and have a compensating element disposed around the sleeve above an opening, the compensating element being moveable axially under the effect of a spring force in order to exert a pressure on the carrier and hence on the element encompassing the housing, as a result of which a constant friction moment can be provided over the lifespan of the drive since the clearance occurring as a result of possible relaxation of the plastic material is compensated for by displacement of the compensating element and hence by axial displacement of the carrier together with the encompassing element. Since the spring force acts axially, a defined and uniform friction between the housing and the engaging element is produced.

In order to exert the spring force, at least one spring which acts axially relative to the central axis of the housing is advantageously disposed between the compensating element and the housing, preferably two springs are provided which are configured in turn preferably as spiral springs. However also merely one spiral spring can be disposed coaxially to the sleeve. By means of such an arrangement, the axial force which presses the encompassing element with the mirror carrier upwards, viewed in the drawing, can be produced in a simple manner.

In a preferred embodiment, the springs, preferably the spiral springs, are disposed symmetrically to the central axis and pins for centering the springs are likewise preferably moulded on the compensating element. As a result of these means, the forces are directed uniformly towards the compensating plate, on the one hand, and the springs are guided accurately axially so that no tilting between the housing and the encompassing element occurs and the defined friction between the mentioned parts is ensured.

The compensating element can have a plate-shaped configuration, with the moulded-on pins for centering the springs, the plate-shaped element preferably being curved or having two prism-like faces. This embodiment is particularly advantageous since the compensating element is a component, i.e. a bearing element, of a double cylinder rotary bearing arrangement for pivoting the carrier and the encompassing element. For this purpose, the carrier configured as a plate has a moulded-on partial cylinder in the centre, a further bearing element being disposed between the partial cylinder of the carrier and the compensating element, the bearing face orientated towards the partial cylinder of which comprises, for the same, two prism-like faces or a curved face and the face orientated towards the compensating element of which is configured as partial cylindrical sliding face.

In this way, a double cylinder V-guide is formed, in one embodiment, in the case of which the respective partial cylindrical faces of the carrier plate and of the further bearing element have a linear support on the prismatic faces.

In total, a tolerance compensation in the anti-rotation mounting is produced and it becomes possible to compensate for centering errors caused during manufacture. As a result, a uniform contact between the outer face of the housing and the inner face of the encompassing element results.

An embodiment of the invention is represented in the drawing and is explained in more detail in the subsequent description. There are shown FIG. 1 a section through the drive according to the invention and FIG. 2 a schematic representation of the rotary bearing used in the embodiment according to the invention, having anti-rotation means and a double cylinder V-guide.

Figure 2:
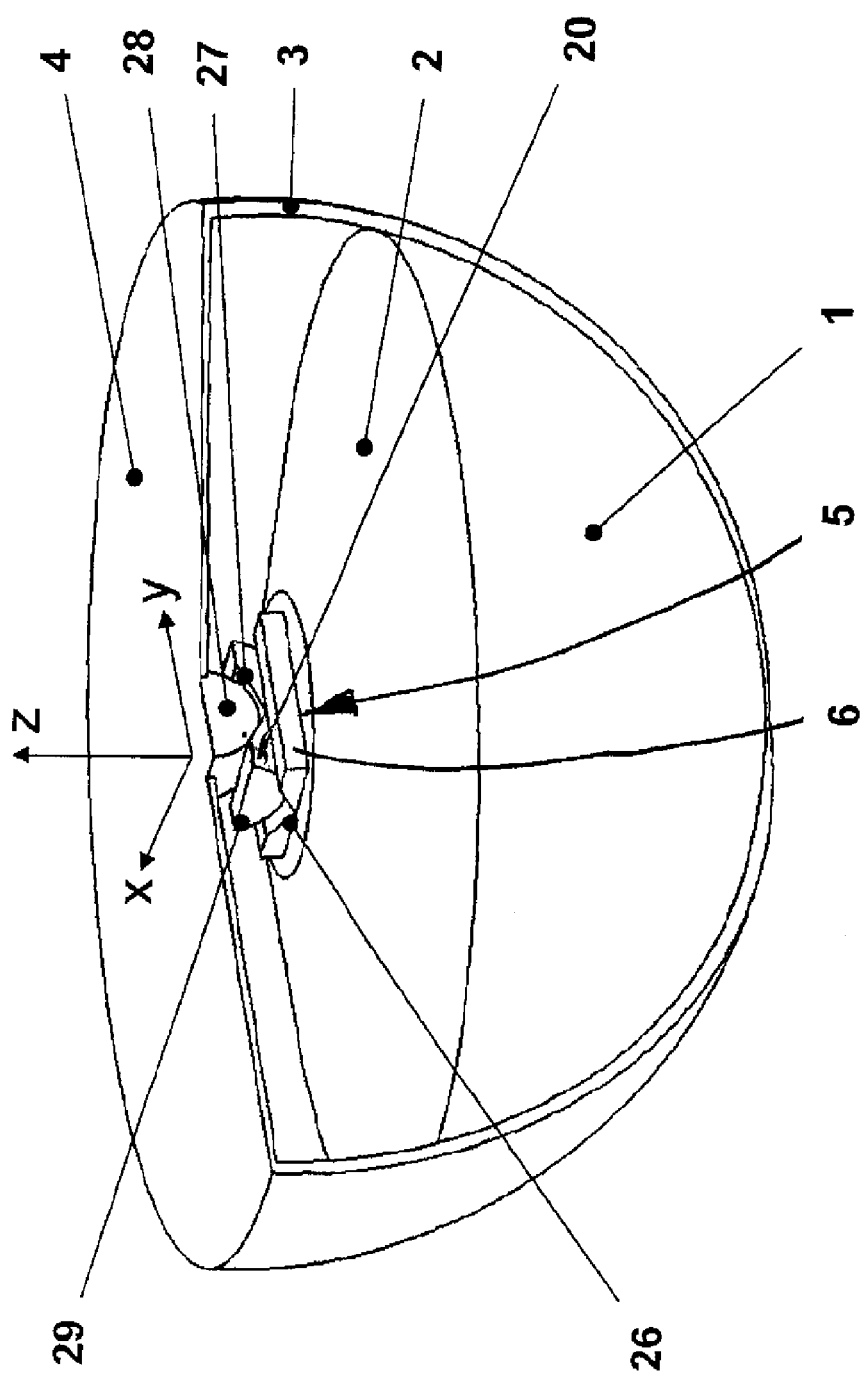

The drive represented in FIG. 1, corresponding to the invention, has a shell-shaped lower housing 1 and an upper housing which is connected to the lower housing 1, for example via snap-in locking and/or clip connections, said upper housing sealing the lower housing in the manner of a cover. In the thus formed housing 12, drive elements are accommodated, such as e.g. electromotors, transmission screws and gear wheels.

The shell-shaped housing 12 comprising lower housing 1 and upper housing 2 is covered by an annular drive shell 3 which is connected to a carrier plate 4, the connections being able again to be snap-in locking and clip connections. There is understood by annular drive shell that the lower housing 1 is covered only in regions, as can be detected readily in FIG. 1. The inner face of the drive shell 3 slides on the outer face of the shell-shaped lower housing 1, as a result of which the carrier plate 4 is pivoted. On the carrier- or adapter plate 4, a mirror element of a rearview mirror for automotive vehicles is mounted, in the preferred embodiment.

On the inside of the drive shell 3, a gearing 13 is indicated in the illustrated embodiment, which gearing is engaged with a drive toothed wheel, not illustrated, which penetrates through the lower housing 1 and is driven via transmission elements by an electromotor (not illustrated). A further gearing 13 is disposed approx. 90° relative to the illustrated gearing 13 and is in communication with a further drive gear wheel, not illustrated. As a result, the carrier plate 4 can be pivoted in all directions.

In the upper housing 2, a recess 15 with hollow projections is provided about a central axis 14 of the drive, into which recess a further compensating element 6 which is described further on is inserted. Furthermore, a bearing arrangement 5 which allows pivoting of the carrier with drive shell 3 is inserted between housing 12 and carrier 4.

As can be detected in FIG. 1, the drive is mounted on a stationary structure 10, for example a part of a mirror carrier part connected to the automotive vehicle, a socket 21 of the drive being connected to a corresponding plug of an electrical line. Normally, the drive is screwed together with the stationary structure 10 by means of a mounting screw 11 such that the lower housing 1 is supported on the stationary structure 10 by support points provided by projections 9. In order to achieve a secure support of the drive over the entire lifespan, a sleeve 8, as can be detected in FIG. 1, is received in the housing 12 about the central axis 14. At one end, the sleeve 8 has a plate spring-like projection 22 which is supported on the base 23 of the lower housing 1, this base 23 having an inwardly drawn raised portion 24 which engages in the plate spring-like projection 22. An extension 25 of the hollow projection 19 thereby presses from the top (corresponding to FIG. 1) on the plate 22. The sleeve 8 penetrates through the parts of the mounting 5 and protrudes into a recess of the carrier plate 4 which is configured to allow pivoting of the carrier plate 4 together with the drive shell 3. In order to screw the mounting screw 11 into the stationary structure 10, the screw 11 is guided through the sleeve 8 and, during tightening, the plate-shaped projection is pressed against the base 23 and the raised portion 24 so that essentially the air between these parts is eliminated and the base is retained under tension. As a result, the pretension force is distributed to the support projections 9 so that the screw cannot become loose over the lifespan and the drive sits securely on the stationary structure.

The compensating element 6 inserted in the recess 15 of the upper housing 2 comprises a plate-shaped part 16 on which two pins 17, which protrude into the recess 15, and two guides 18 are moulded. The plate-shaped upper part 16 and also the recess 15 have a square outline. The recess 15 continues into the moulded-on hollow projections 19 which serve for receiving the pins 17 and the guides 18. Between the base of these hollow projections 19 and the plate-shaped upper part 16 of the compensating element 6, spiral springs 7 under pretension are inserted around the pins 17. These springs 7 hence press the compensating element 6 upwards in FIG. 1.

The axis of rotation of the drive, for example of a mirror adjustment drive, is determined by the partial spherical face on the drive shell 3 and by the spherical face on the lower housing. The drive shell 3 with carrier plate 4 thereby pivots about a mounting 5 with anti-rotation means which is explained in more detail with the help of FIG. 2. In this FIG. 2, the lower housing 1 and the upper housing 2 and also the drive shell 3 with carrier plate 4 are illustrated schematically and serve in this form for explaining the mounting 5. A coordinate system is designated, in the known manner, with x, y and z, The compensating element 6, a part of the upper part of which can be seen here schematically, has a V-guide 26 comprising two diagonal faces on which an anti-rotation element or intermediate element 20 is situated. This intermediate element 20 is provided with a partial cylinder face 29 on the side orientated towards the compensating element 6, which partial cylinder face can be configured, as represented in FIG. 1, also in individual runners. A partial cylinder 28 is likewise moulded on the carrier plate 4, as can be detected in section also in FIG. 1. This partial cylinder 28 is received by the intermediate element 20 which has a guide, in the present case a V-guide 27 consisting of two diagonals, on the side orientated towards the partial cylinder 28. Because of this arrangement of the mounting, in the case of centering errors caused by the manufacturer, i.e. in the case of non-centricity, the intermediate bearing element 20 can undertake a linear movement in the y-direction and the cylinder 28 in the V-guide 27 can perform a linear movement in the x-direction. In this way, tolerance compensation takes place. Due to the double cylinder V-guide 26, 27, 28, 29, respectively a linear contact between the diagonal faces of the V-guides 26 and 27 and the assigned partial cylinders 28 and 29 takes place during pivoting of the drive shell 3 and the carrier plate 4 about the x axis and the y axis.

If the plastic material is subject to relaxation in the course of the lifespan of the drive by means of which clearance could occur between the lower housing 1, i.e. between its outer spherical face, and the drive shell 3, i.e. its inner spherical face, the spiral springs 7 press the compensating element 6 upwards in FIG. 1, as a result of which also the parts of the mounting 5 and hence the carrier plate 4 together with the drive shell are pressed upwards so that the drive shell 3 abuts still against the lower housing 1 and a defined friction between the lower housing 1 and the drive shell 3 is produced. Due to the axial spring force of the spiral springs 7 and the compensating element 6, the drive shell 3 is hence retained against the lower housing 1 without clearance uniformly over the entire circumference.

What is claimed is:

1. A drive for a component to be adjusted, in particular for an adjustable automotive vehicle mirror, comprising:
   a housing which can be mounted on a stationary structure and has a central axis for receiving drive elements, the housing including a fixed base and
   an element encompassing the housing at least partially and connected to a carrier for the component, the encompassing element with the carrier being disposed pivotably relative to the housing,
   wherein about the central axis, a pin-like sleeve for guiding through a mounting element, is disposed in the housing and has a plate spring-like projection for direct support on the fixed base of the housing, the plate spring-like projection forming a means for uniform distribution of the tension force caused by the mounting element for mounting on the stationary structure by being part of the pin-like sleeve at the end adjacent to the fixed base of the housing.

2. The drive according to claim 1, wherein the housing comprises a shell-shaped lower housing and a cover-like upper housing which has an opening for penetration of the sleeve.

3. The drive according to claim 1, wherein a raised portion pointing into the interior of the housing is moulded on the base and is covered by the plate spring-like projection.

4. The drive according to claim 1, wherein at least one projection moulded on the upper housing forms a limit stop for holding down the plate spring-like projection.

5. The drive according to claim 1, wherein the housing has at least three support projections as support points on the stationary structure in the region of the base.

6. The drive according to claim 1, wherein means are provided around the sleeve for elastic pretension between the housing and the encompassing element and have a compensating element disposed around the sleeve, the compensating element being moveable axially under the effect of a spring force in order to exert a pressure on the carrier and hence on the element encompassing the housing.

7. The drive according to claim 1, wherein at least one spring which acts axially relative to the central axis of the housing is disposed between the compensating element and the housing.

8. The drive according to claim 6, wherein at least two springs are provided symmetrically to the central axis, pins for centering the springs being disposed on the compensating element.

9. The drive according to claim 1, wherein a double cylinder bearing arrangement is disposed between the housing and the carrier, the bearing elements of which have openings for penetration of the sleeve.

10. The drive according to claim 6, wherein the compensating element forms a bearing element and has a guide comprising two prism-like faces or a curved face.

11. The drive according to claim 9, wherein the carrier is configured as a carrier plate for mounting a mirror and in that a partial cylinder as bearing element is moulded centrally on the carrier plate.

12. The drive according to claim 10, wherein an intermediate bearing element is disposed between the partial cylinder of the carrier plate and the compensating element, which intermediate bearing element has a guide, which is orientated towards the partial cylinder and comprises prism-like faces or curved bearing faces, and a partial cylindrical sliding face orientated towards the compensating element.

* * * * *